Patented Jan. 7, 1947

2,414,015

UNITED STATES PATENT OFFICE 2,414,015

SULFOSUCCINATE ESTERS OF p-TERTIARY-BUTYLCYCLOHEXANOL

Joseph J. Carnes, Greenwich, Conn., assignor to American Cyanamid Company, New York, N. Y., a corporation of Maine No Drawing. Application September 1, 1945, Serial No. 614,087

1 Claim. (Cl. 260—481)

This invention relates to surface-active compounds and their methods of preparation, and more particularly to sulfosuccinate esters of p-tertiary-butylcyclohexanol. A principal object of the invention is to provide a new class of chemical compounds having good wetting, detergent and anti-fogging properties.

I have found that the mono and diesters of sulfosuccinic acid with 4-tertiary-butylcyclohexanol are surface-active compounds possessing a number of improved properties. The monoesters, when used in the form of their disodium or dipotassium salts, possess good detergent properties. The diesters are excellent wetting agents and are also good anti-fogging agents which retain their activity after repeated exposures of transparent objects coated therewith to humid atmospheres.

The compounds of the invention have the following structural formula

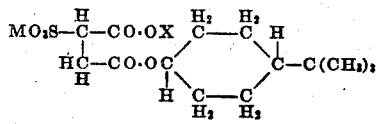

in which M is a salt-forming metal and is preferably sodium, potassium or ammonium and X is either M or a p-tertiary-butylcyclohexyl radical.

The novel compounds of my invention are preferably prepared by esterifying maleic acid or anhydride with 4-tertiary-butylcyclohexanol to produce the monoester or diester, followed by sulfonating the ester so obtained to form the sulfosuccinate. Preferably the sulfonation is carried out by heating the ester with an aqueous solution of sodium sulfite, sodium bisulfite or sodium metabisulfite, or of the corresponding potassium or ammonium compounds. By this method the water-soluble salts of the sulfosuccinate esters are obtained directly.

The mono-(4-tertiary-butylcyclohexyl) sulfosuccinate is prepared by mixing equimolecular quantities of maleic anhydride and p-tertiary-butylcyclohexanol and agitating the mixture at about 100–110° C. until the reaction is complete. The mono-p-tertiary-butylcyclohexyl maleate is then poured into a water solution of sodium sulfite and heated on a steam bath for 1–2 hours, or until the sulfonation is complete. Upon evaporating the solution to dryness the product is obtained as a white, waxy solid which dissolves in warm water to clear, foaming solutions having good detergent properties.

The di-(p-tertiary-butylcyclohexyl) sulfosuccinate is prepared by the same general procedure, but sufficient of the alcohol is used to completely esterify the maleic anhydride or maleic or fumaric acid. The esterification is preferably carried out in the presence of a solvent such as toluene with the aid of an esterification catalyst and the product is sulfonated by refluxing with a solution of sodium metabisulfite in aqueous ethanol.

*Example*

4-tertiary-butylcyclohexanol was prepared by hydrogenating p-tertiary butylphenol under 1,800 pounds per square inch at 175° C. in the presence of a nickel hydrogenation catalyst. The hydrogenated product was melted, filtered to remove the catalyst and purified by distillation at 125–129° C. under a reduced pressure of 30 mm. of mercury.

Di-(4-tertiary-butylcyclohexyl) maleate was formed by heating a mixture of 272 parts by weight (1.58 mols+10% excess) of the 4-tertiary-butylcyclohexanol, 78 parts (0.79 mol) of maleic anhydride, 5 parts of p-toluenesulfonic acid and 300 parts of toluene with reflux at 118–124° C. for 5.5 hours. The product was cooled and washed with water and then with 2.5% sodium hydroxide solution and again with water until the washings were neutral. The toluene was then distilled off and the residue stripped of excess alcohol by heating to 195° C. under 0.3 mm. of mercury pressure. The product was a light yellow, very viscous oil having a purity of 99%.

A mixture of 200 grams of the di-(4-tertiary-butylcyclohexyl) maleate, 50 grams of sodium metabisulfite ($Na_2S_2O_5$), 250 cc. of ethanol and 75 cc. of water was refluxed with stirring at 81° C. for 9 hours. The resulting solution was filtered and cooled, whereby 251 grams of sodium di-(4-tertiary-butylcyclohexyl) sulfosuccinate were obtained as a white, crystalline solid, readily soluble in hot water to a clear solution which formed a white gel on cooling. The product was tested for wetting times at various concentrations and for calcium tolerance by the Draves Wetting Test and by titration with calcium chloride solution with the following results:

| | Per cent concentration of the wetting agent | | | | | | |
|---|---|---|---|---|---|---|---|
| | 0.5 | 0.1 | 0.075 | 0.05 | 0.03 | 0.02 | 0.01 |
| P. P. M—$CaCO_3$ | 412 | 502 | | 628 | | | |
| Sinking time, sec. | | | 16 | 18 | 29 | 55 | 98 |

The product was evaluated as an anti-fogging agent by applying a 10% alcohol solution to both sides of a glass panel, which was cooled to about 0° C. and then introduced into a humid atmosphere at 34-35° C. Resistance to fogging was measured by the length of time a standard test chart remained visible when viewed through the glass. The panel was then allowed to dry, dipped in water, allowed to dry again, and again chilled and thrust into the humid atmosphere. A test chart having 56 lines per inch was visible for 10 seconds during the first cycle; after dipping in water a chart of 40 lines was visible for the same time, and after again drying and dipping in water a chart of 10 lines was visible for 10 seconds. This test shows that the product is a good anti-fogging agent having a long effective life when applied to automobile windshields, aviator's goggles, or other transparent surfaces where fogging is likely to occur.

What I claim is:

Di-(p-tertiarybutylcyclohexyl) sodium sulfosuccinate.

JOSEPH J. CARNES.